United States Patent
Harney et al.

(10) Patent No.: US 12,136,442 B1
(45) Date of Patent: Nov. 5, 2024

(54) SYSTEM, METHOD, AND COMPUTER PROGRAM FOR PROVIDING AN INTERACTIVE PLATFORM FOR VIDEO GENERATION IN WHICH USERS ARE ABLE TO INTERACT WITH MACHINE-LEARNING ASSET ENHANCEMENT MODULES VIA PROXY ELEMENTS IN A VIDEO PRODUCTION WORKSPACE

(71) Applicant: GoAnimate, Inc., San Mateo, CA (US)

(72) Inventors: Matthew Harney, Bangkok (TH); Gary Alan Lipkowitz, Brisbane, CA (US)

(73) Assignee: GoAnimate, Inc., San Mateo, CA (US)

( * ) Notice: Subject to any disclaimer, the term of this patent is extended or adjusted under 35 U.S.C. 154(b) by 154 days.

(21) Appl. No.: 18/108,393

(22) Filed: Feb. 10, 2023

Related U.S. Application Data (60) Provisional application No. 63/433,403, filed on Dec. 16, 2022.

(51) Int. Cl.
   *G11B 27/036* (2006.01)
(52) U.S. Cl.
   CPC .................................. *G11B 27/036* (2013.01)
(58) Field of Classification Search
   CPC ................................................... G11B 27/036
   See application file for complete search history.

(56) References Cited

U.S. PATENT DOCUMENTS

2020/0043121 A1* 2/2020 Boyce .................. G06T 15/005

* cited by examiner

*Primary Examiner* — Girumsew Wendmagegn
(74) *Attorney, Agent, or Firm* — Lessani Law Group, PC (57) ABSTRACT

This disclosure relates to a system, method, and computer program for enabling an interactive process for video generation in which a user is able to guide the output of machine-learning asset enhancement modules to produce assets for a video. The system enables the user to interact with the asset enhancement modules via proxy elements in a video production workspace. The system provides a novel way to produce and edit video. The system enables any asset added to a video production workspace to serve as a proxy asset that a user can leverage to guide the output of one or more machine learning models trained to generate a type of multimedia asset. Specifically, a user can select an asset in the video production workspace, provide input on what attributes the user would like the asset to have, and the system then uses one or more machine-learning modules to generate an asset with the attributes requested by the user. The machine-generated asset may visually replace the selected asset at the same time and location in the video as the selected asset. A user is able to transform any asset to any other asset. Even a simple shape can serve as a proxy for a much more complex asset, even an asset of different multimedia type. A user may transform assets independently of each other and the video as a whole, or in conjunction with each other and the video as a whole.

18 Claims, 9 Drawing Sheets

ML Enhancement Module

SYSTEM, METHOD, AND COMPUTER PROGRAM FOR PROVIDING AN INTERACTIVE PLATFORM FOR VIDEO GENERATION IN WHICH USERS ARE ABLE TO INTERACT WITH MACHINE-LEARNING ASSET ENHANCEMENT MODULES VIA PROXY ELEMENTS IN A VIDEO PRODUCTION WORKSPACE

RELATED APPLICATIONS

This application claims the benefit of U.S. Provisional Application No. 63/433,403 filed on Dec. 16, 2022, and titled "Interactive System for Generative Video," the contents of which are incorporated by reference herein as if fully disclosed herein.

FIELD OF THE INVENTION

This invention relates generally to video generation and, more specifically, to a system that enables an interactive process for video generation in which users of the system are able to guide the output of machine-learning asset enhancement modules via proxy elements in a video production workspace.

BACKGROUND

Current video production currently requires technical expertise in different fields ranging from visual art, storytelling, motion editing, dialogue writing, character animation and more. These skills are diverse and difficult for one individual to understand. Whilst many computer systems are available to make video, these systems are often split into many different steps, such as storyboarding, preparing video source material, importing video source material, trimming video in clips of desired length, arranging audio, and finally exporting a video track. A single video clip is composed of many elements—for example characters (actors), props, environment, actions, dialogue etc. Each of these elements needs extra workflow steps just to produce a single video clip.

Advances in machine learning technology allow for the embedding of these expert skills into complex software models via deep learning methods. Unfortunately controlling these machine learning models is challenging due to their hidden complexity. Recent advancements do allow users to interact with machine learning models via text prompts, but a text-based method is a limited way to work with video production due to both the non-visual representation, and lack of any useful metadata. Current machine learning technology also treats the video as an indivisible single entity, which is also very limiting for the video creators.

Therefore, there is strong demand for a better way to produce and edit the components of a video, and/or the video itself, from storyboarding to final video, that also enables users to easily and intuitively leverage advances in machine learning technology.

SUMMARY OF THE INVENTION

This disclosure relates to a system, method, and computer program for providing an interactive platform for video generation in which users are able to guide the output of asset enhancement modules to produce assets for video. The users interact with the asset enhancement modules via proxy elements in a video production workspace. The system enables any asset added to a video production workspace to serve as a proxy asset that a user can leverage to guide the output of one or more machine learning or algorithmic modules trained or configured to generate a type of multimedia asset. An asset may be one of many different types of multimedia elements, such as text, audio, images, animation, and video.

The system provides a novel way to produce and edit video. A user can use the system to generate any multimedia asset, from text, diagrams, video, dialogue, sound effects and music. The system enables a user to transform any asset to any other asset. For example, the user can instruct the system to convert a 2D cartoonish image of a character to a photorealistic version of a person. Alternatively, the user could add a simple shape, such as a square, to the video production workspace and instruct the system to turn the shape into a photorealistic image of a person having certain characteristics. In this sense, the selected asset is just a proxy that will be replaced by a machine-generated asset. The system also enables a user to generate a new asset that works in conjunction with the selected asset. For example, a user can ask the system to generate an audio track for an animation in the video production workspace.

The system includes an asset enhancement platform that includes a set of machine-learning modules for asset enhancement ("ML enhancement modules"). The platform may include ML enhancement modules capable of generating a variety of different multimedia assets. There may be modules that are trained to produce an asset in a certain style, such as a photo-realistic image, a cartoon, or a proprietary style (e.g., a style consistent with a particular movie).

To guide the ML enhancement modules, the user selects an asset in the video production workspace and provides an instruction to the system with respect to the asset. From this instruction, the system ascertains user-defined attributes of the asset the user would like the system to generate. The system also identifies system-defined attributes of the selected asset. The system uses the user-defined attributes and the system-defined attributes to identify which ML enhancement module(s) are suited to generate the asset requested by the user. The system inputs the selected asset, the system-defined attributes of the selected asset, and the user-defined attributes of the output asset into the identified ML enhancement module(s) to obtain a machine-generated asset with the user-defined attributes. The system then links the machine-generated asset to the selected asset. Depending on the nature of the user's request, the machine-generated asset may visually replace the selected asset in the video or be made perceptible in conjunction with the selected asset in the video.

In one embodiment, a computer system provides an interactive platform for video generation by performing the following steps:
  providing a multimedia video production workspace for creating videos;
  enabling a user to add a plurality of multimedia assets for a video to the multimedia workspace;
  providing an asset enhancement platform comprising a plurality of machine-learning modules trained to generate assets for a video in response to receiving an input asset, system-defined attributes of the input asset, and user-defined attributes for an output asset; and
  enabling a user to trigger and guide the output of the asset enhancement platform by performing the following:

enabling a user to select an asset in the video production workspace and to enter an asset enhancement request for the selected asset, wherein the selected asset can be enhanced independent of other assets in the video and wherein any asset in the multimedia workspace may serve as a proxy for a machine-generated asset;

receiving an asset enhancement request for a selected asset;

identifying a location and a time window in the video associated with the selected asset;

identifying one or more user-defined attributes for the asset enhancement request;

identifying one or more system-defined attributes of the selected asset;

identifying one or more machine learning modules in the asset enhancement platform to use to process the asset enhancement request;

using the identified machine-learning module(s) to obtain a machine-generated asset having the user-defined attributes, wherein the selected asset, the user-defined attributes, and the system-defined attributes are inputted into the identified asset enhancement module(s);

linking the machine-generated asset to the selected asset in the visual production workspace;

determining whether to visually replace the selected asset with the machine-generated asset in the workspace;

in response to determining to visually replace the proxy asset with machine-generated asset, visually replacing the selected asset with the machine-generated asset, wherein the machine-generated asset is displayed in the same location as the selected asset within the video production workspace and during the same time window as the selected asset; and in response to determining to add the machine-generated asset to the video production workspace without visually replacing the selected asset, making the machine-generated asset perceptible to a user in the video production workspace in conjunction with the selected asset and during the same time window as the selected asset.

The asset enhancement platform may also include algorithmic asset enhancement modules that are algorithmically configured to generate assets. The user interacts with the algorithmic modules in the same way as the ML enhancement modules.

DETAILED DESCRIPTION OF THE PREFERRED EMBODIMENTS

This disclosure relates to a system, method, and computer program for enabling an interactive process for video generation in which users are able to guide the output of machine-learning asset enhancement modules to produce assets for a video, wherein the users interact with the asset enhancement modules via proxy elements in a video production workspace. The method is performed by a computer system ("the system").

1. Definitions

An asset is an element of a video. An asset may be any number of multimedia types, such as audio, video, voice, images, animations, text. Assets also may include proprietary video asset types (as might be known to a video production software), such as characters, character actions, backgrounds, and props.

A scene is a virtual stage in a user interface of a video production software on which a user can arrange assets for a video. A video typically comprises a series of scenes.

2. Overview

The system provides a novel way to produce and edit video. A user can use the system to generate any multimedia asset, such as text, diagrams, video clips, dialogue, sound effects, and music. The system enables a user to transform any asset to any other asset. For example, the user can instruct the system to convert a 2D cartoonish image of a character to a photorealistic version of a person. Alternatively, the user could add a simple shape, such as a square, to the video production workspace and instruct the system to turn the shape into a photorealistic image of a person having certain characteristics. In this sense, the selected asset is just a proxy that will be replaced by a machine-generated asset. The proxy may simply serve as a place (and time) holder, or may also carry valuable information such as size, color, function, meaning, related assets, related contexts, etc. The system also enables a user to generate a new asset that works in conjunction with the selected asset. For example, a user can ask the system to generate an audio track for an animation in the video production workspace.

The system includes an asset enhancement platform that includes a set of machine-learning modules for asset enhancement ("ML enhancement modules"). The ML enhancement modules use pre-trained machine-learning models to produce machine-generated assets. The platform may include ML enhancement modules capable of generating a variety of different multimedia assets. There may be modules that are trained to produce an asset in a certain style, such as a photo-realistic image, a cartoon, or a proprietary style (e.g., a style consistent with a particular movie).

To guide the ML enhancement modules, the user selects an asset in the video production workspace and provides an instruction to the system with respect to the asset. From this instruction, the system ascertains user-defined attributes of the asset the user would like the system to generate. The system also identifies system-defined attributes of the selected asset. The system uses the user-defined attributes and the system-defined attributes to identify which ML enhancement module(s) are suited to generate the asset requested by the user. The system inputs the selected asset, the system-defined attributes of the selected asset, and the user-defined attributes of the output asset into the identified ML enhancement module(s) to obtain a machine-generated asset with the user-defined attributes. The system then links the machine-generated asset to the selected asset. Depending on the nature of the user's request, the machine-generated asset may visually replace the selected asset in the video or be made perceptible in conjunction with the selected asset in the video.

The system allows a new paradigm in video production\ as it allows for real time, or near real time, multimedia transformation of assets in a video production workspace. The ML enhancement modules allow a user to iteratively work to create video in very little time. For instance, a user can use the system to generate any multimedia asset, such as text, diagrams, video, dialogue, sound effects and music. The user can work in the domain of the video production system without needing expert knowledge of other systems typically used to produce such assets. The user can work with common user interface elements such as text and images, to not only generate completely new assets but also convert between them. Text can become audio, audio can become video and video can become music, for example.

A user may transform assets independently of each other and the video as a whole, or in conjunction with each other and the video as a whole, depending on which asset(s) a user selects for asset enhancement in the video production workspace.

3. Example Software Architecture

Figure 1:
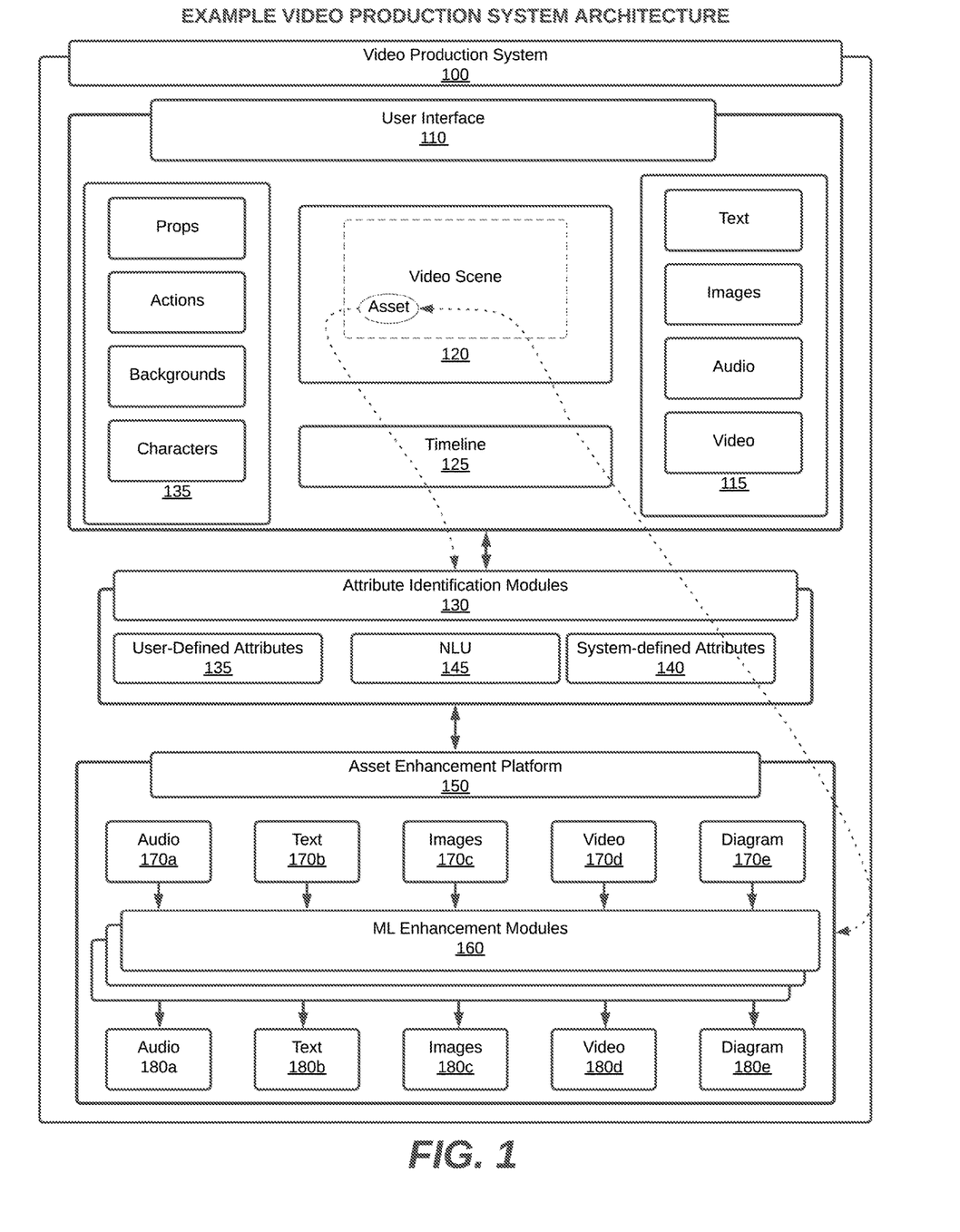
FIG. 1 is a block diagram that illustrates an example software architecture of a video production system according to one embodiment.

FIG. 1 illustrates an example architecture for the system. The system 100 includes a user interface module 110 that generates a video production workspace 120 in which a user can produce and edit videos. The workspace includes a timeline 125 that illustrates the order and time in which scenes in the video appear. A user adds assets to the workspace to create scenes for the video. The type of assets that a user is able to add include both generic media forms 115, such as text, audio, images, animation, and video, and proprietary video asset types 135, such as characters, character actions, backgrounds, and props.

The system includes Asset Identification Modules 130 that identify user-defined attributes 135 for an asset enhancement request, as well as system-defined attributes 140 of a selected asset. The Asset Identification Modules may use a natural language understanding (NLU) model 145 to process natural language asset enhancement requests.

The system includes an Asset Enhancement Platform 150 with a library of ML enhancement modules 160. In one embodiment, the Asset Enhancement Platform can take any asset type accepted in the workspace and output any asset type accepted in the workspace. Any asset the user adds to the workspace can be a proxy for a machine-generated asset. In other words, any asset added to the workspace can be transformed, enhanced, or replaced with a machine-generated asset.

Figure 4:
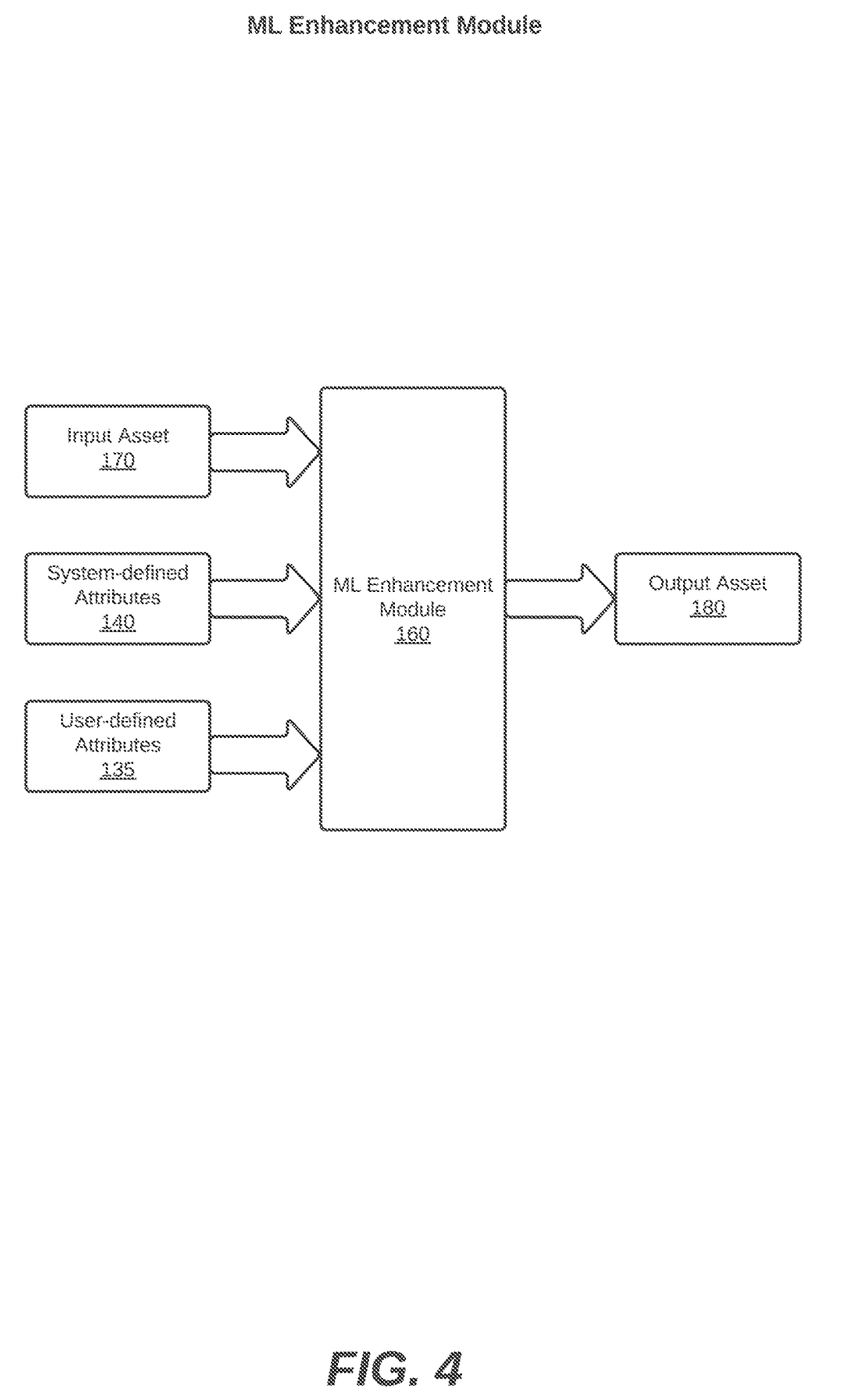
FIG. 4 is a block diagram illustrating the input and output of an ML enhancement module.

Each of the ML enhancement modules 160 uses a machine-learning model that is trained to produce a certain type of asset. As shown in FIG. 4, an ML enhancement module 160 receives an input asset 170 (e.g., the user-selected asset), system-defined attributes for the input asset 140, and user-defined attributes 135 for the asset enhancement request and produces an output asset 180. The ML enhancement module may produce a modified version of the input asset or may create a different type of asset altogether. For example, there may be image-to-image modules, image-to-audio modules, video-to-audio modules, text-to-video modules, diagrams-to-animations modules, text-to-animation modules, etc. The ML enhancement modules 160 may be trained to produce a certain style asset. For example, there may be modules that are trained to transform 2D images into 3D images or photorealistic images. The modules could be organized by style, such as "cartoon," "watercolor," or "neon," and users could preview the effects of each model on their video before selecting the one they want to use.

In certain embodiments, the user interface for the video production system is generated on client computers, and the Asset Enhancement Platform runs on a backend server. The client computers send asset enhancement requests to the Asset Enhancement Platform via an API over the Internet or other network. Also, some of the ML enhancement modules in the Asset Enhancement Platform may run locally on a client computer, and others may run on the backend server.

Figure 3A:
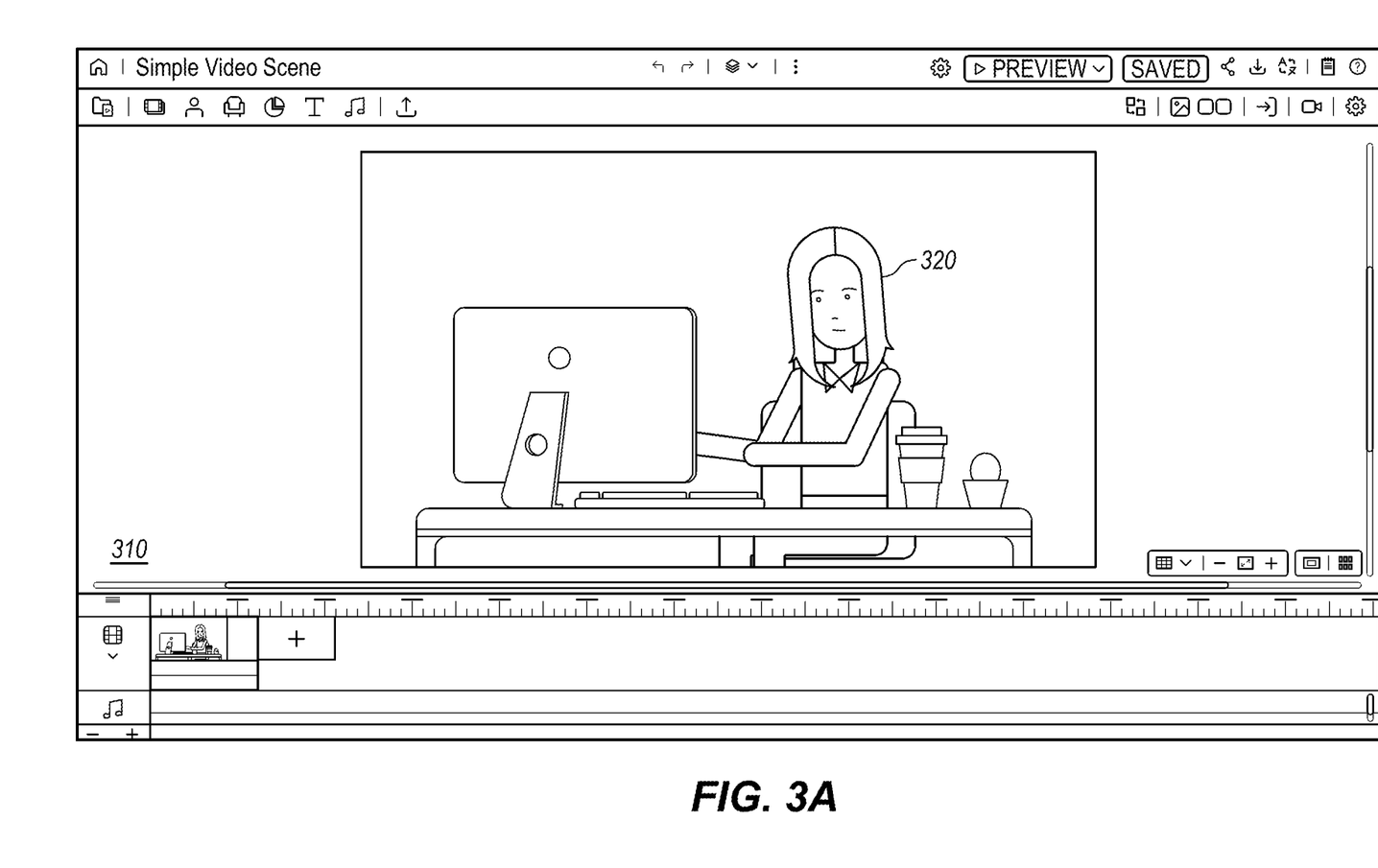
FIGS. 3A-3C are screenshots illustrating an example of a user using an ML enhancement module to transform a character from 2D to 3D.
Figure 3B:
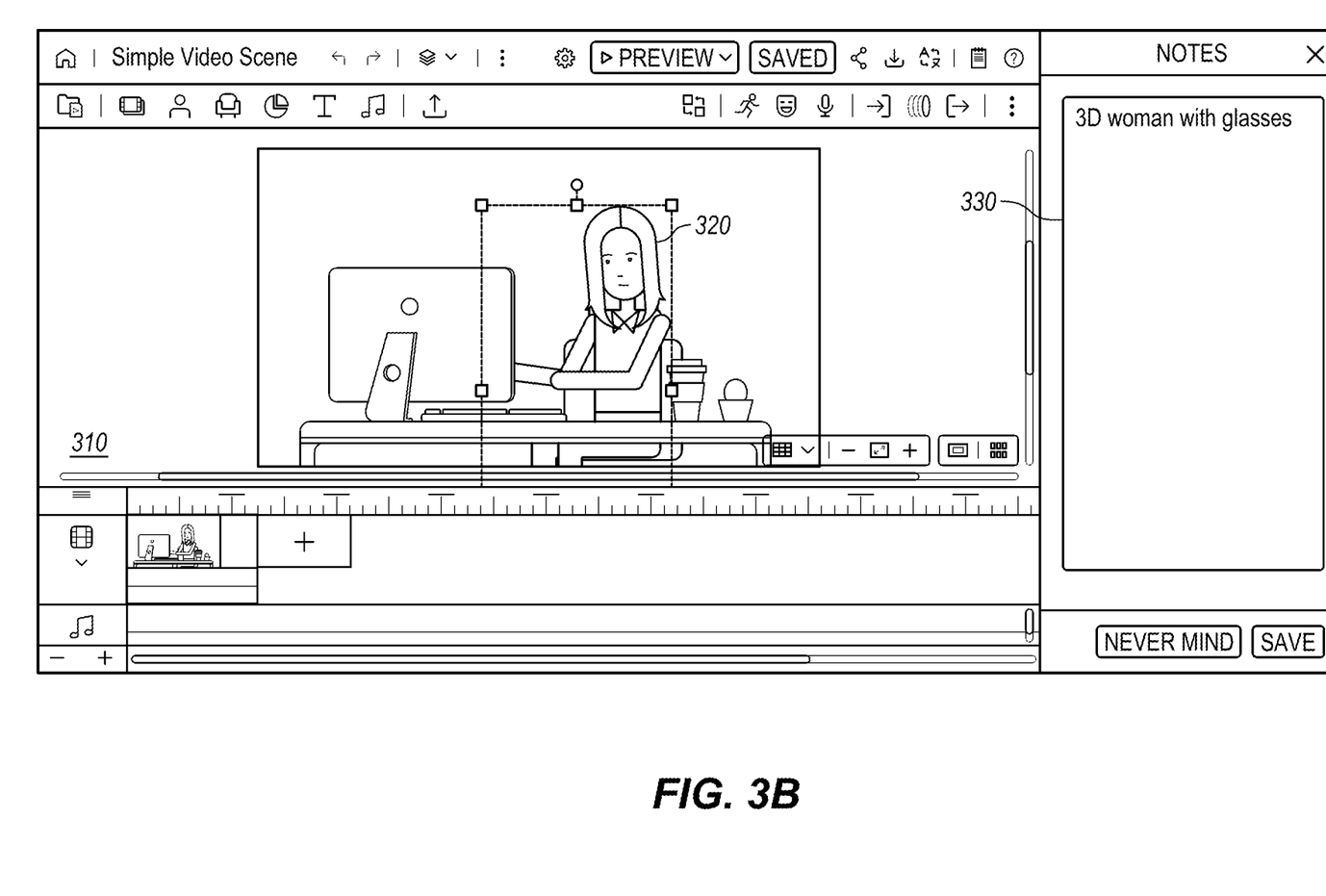
Figure 3C:
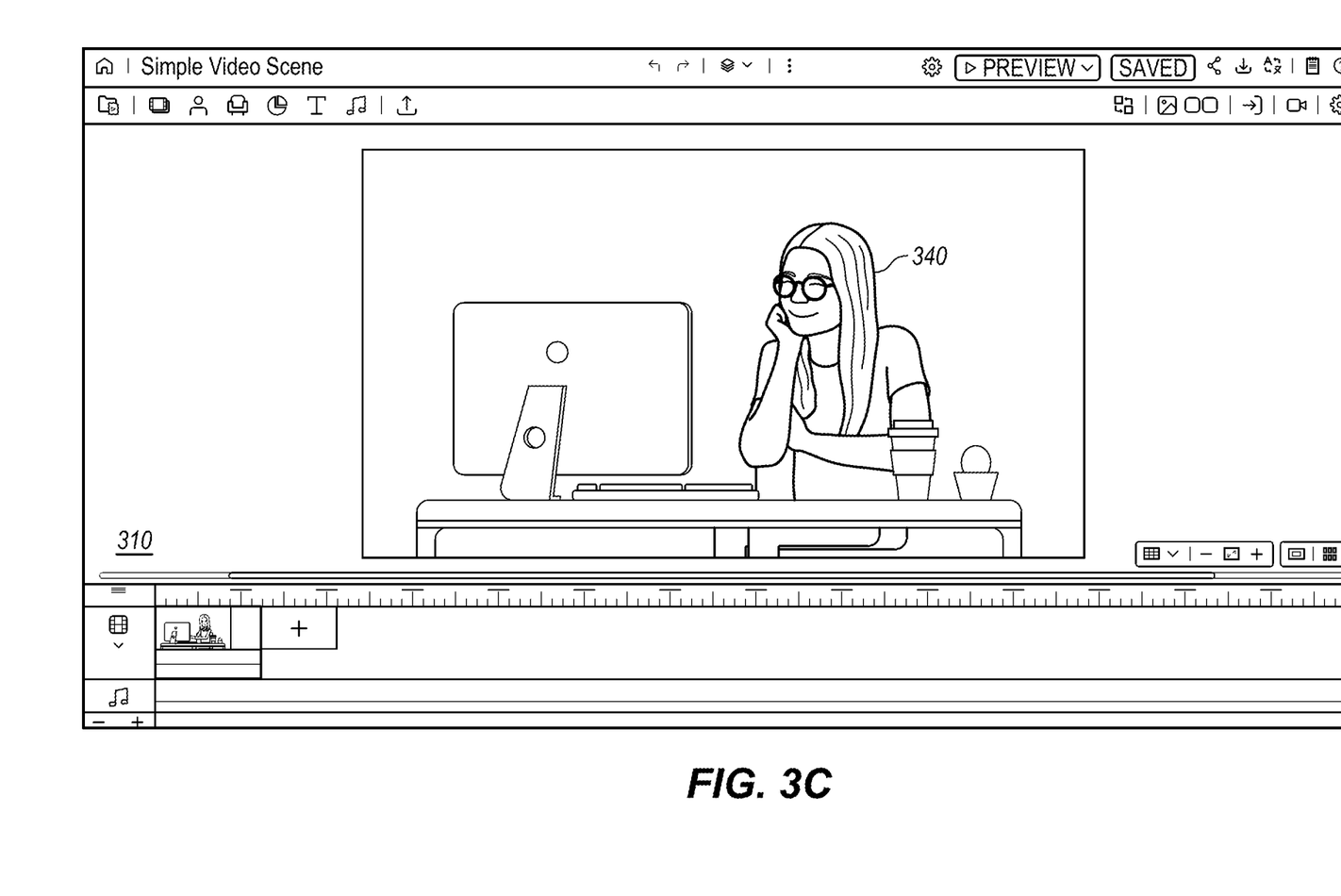

Data may be transferred between client computers and the backend server using JSON format. For the example described below with respect to FIGS. 3A-3C, the user-defined attributes and the system-defined attributed could expressed in JSON format as follows:

{"user_defined_attribute": "3D woman with glasses",
"system_defined_attribute": "character, image, woman office",
"id": "1",
"data": "<encoded>"}

The "id" corresponds to a unique ID for each asset in the video production workspace.

The Asset Enhancement Platform may also include algorithmic asset enhancement modules that are algorithmically configured to generate an asset. A user can guide the output of these modules in the same way as the ML enhancement modules. Like the ML enhancement modules, these modules receive the selected asset, the system-defined attributes of the selected asset, and the user-defined attributes for the asset enhancement as input and then generate an asset with the user-defined attributes.

Figure 2A:
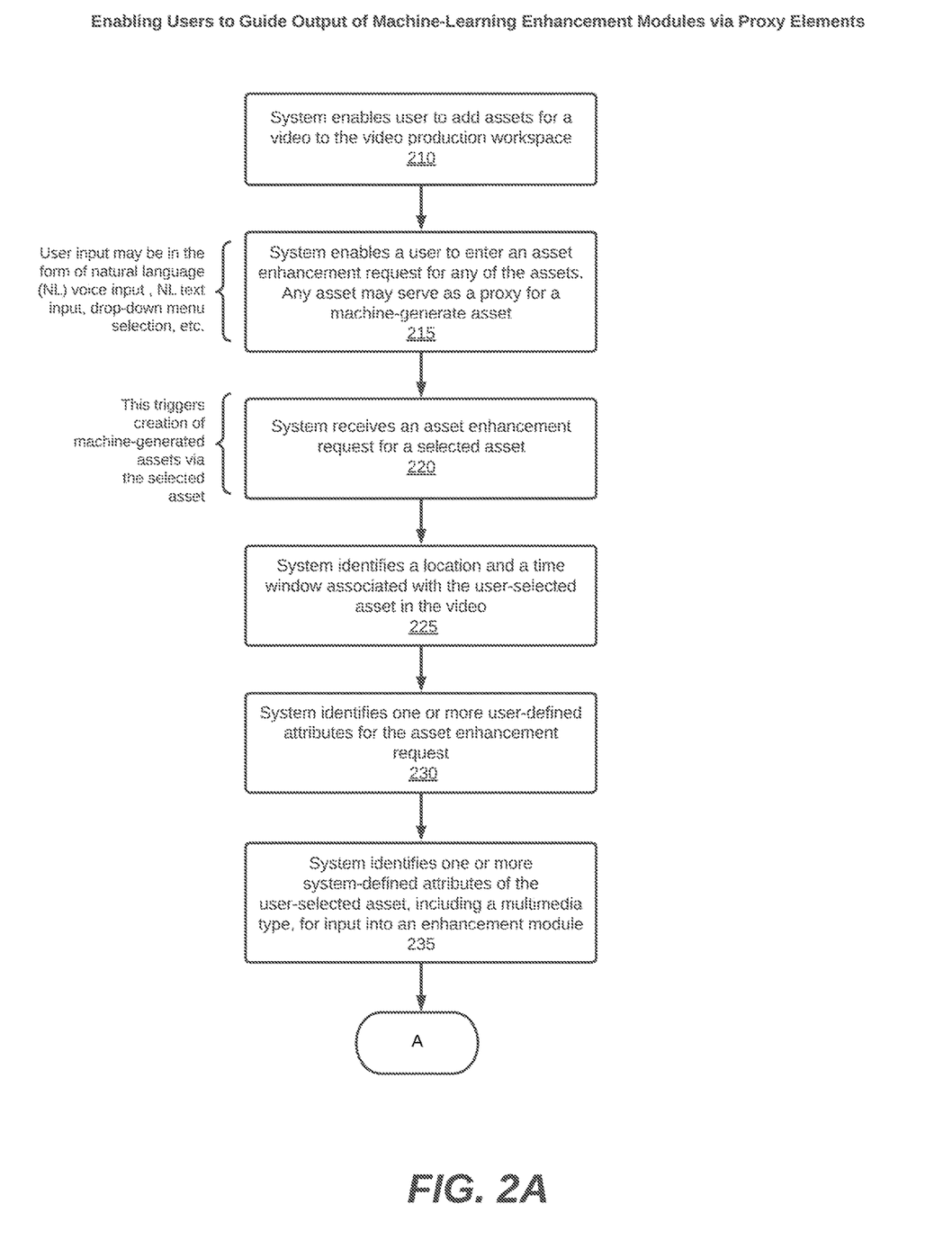
FIGS. 2A-2C are flowcharts that illustrate a method, according to one embodiment, for enabling a user to generate a video by guiding the output of ML enhancement modules through proxy assets in the video production workspace.
Figure 2B:
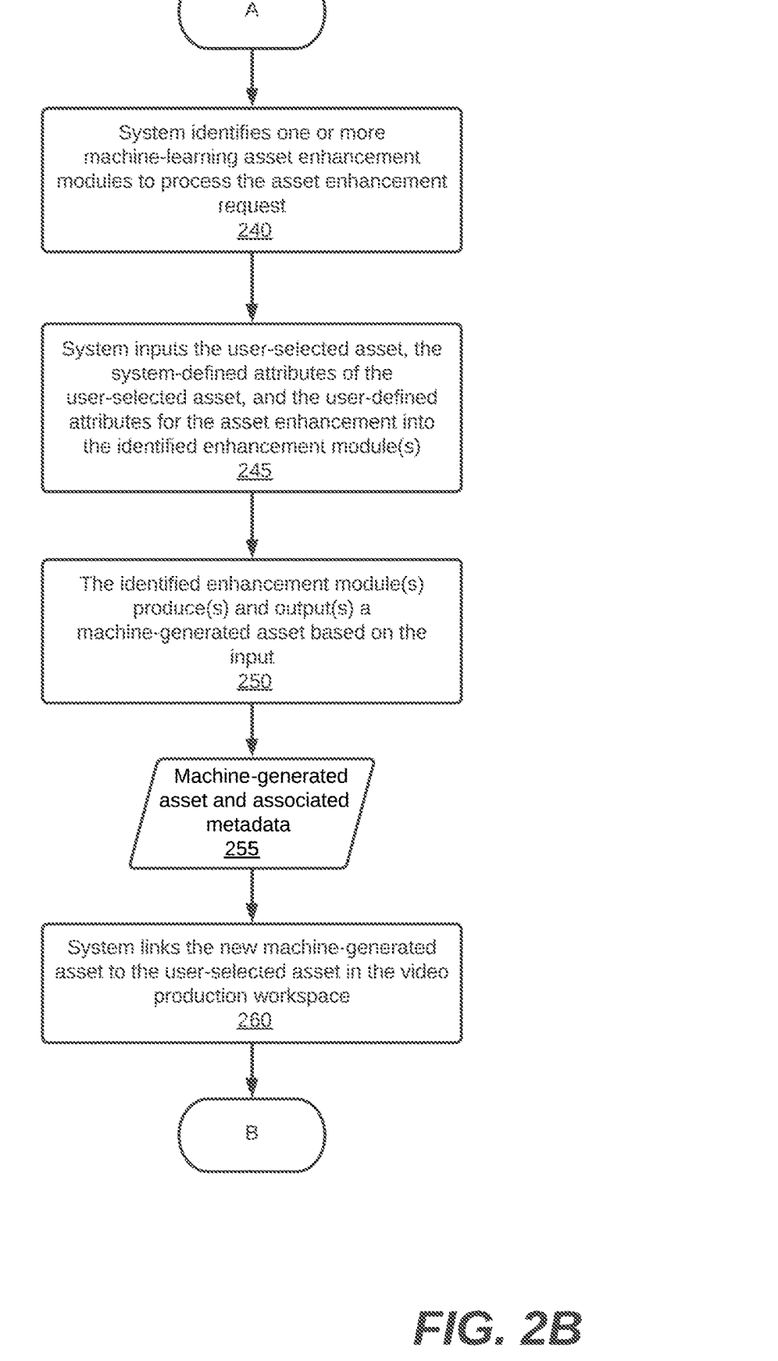
Figure 2C:
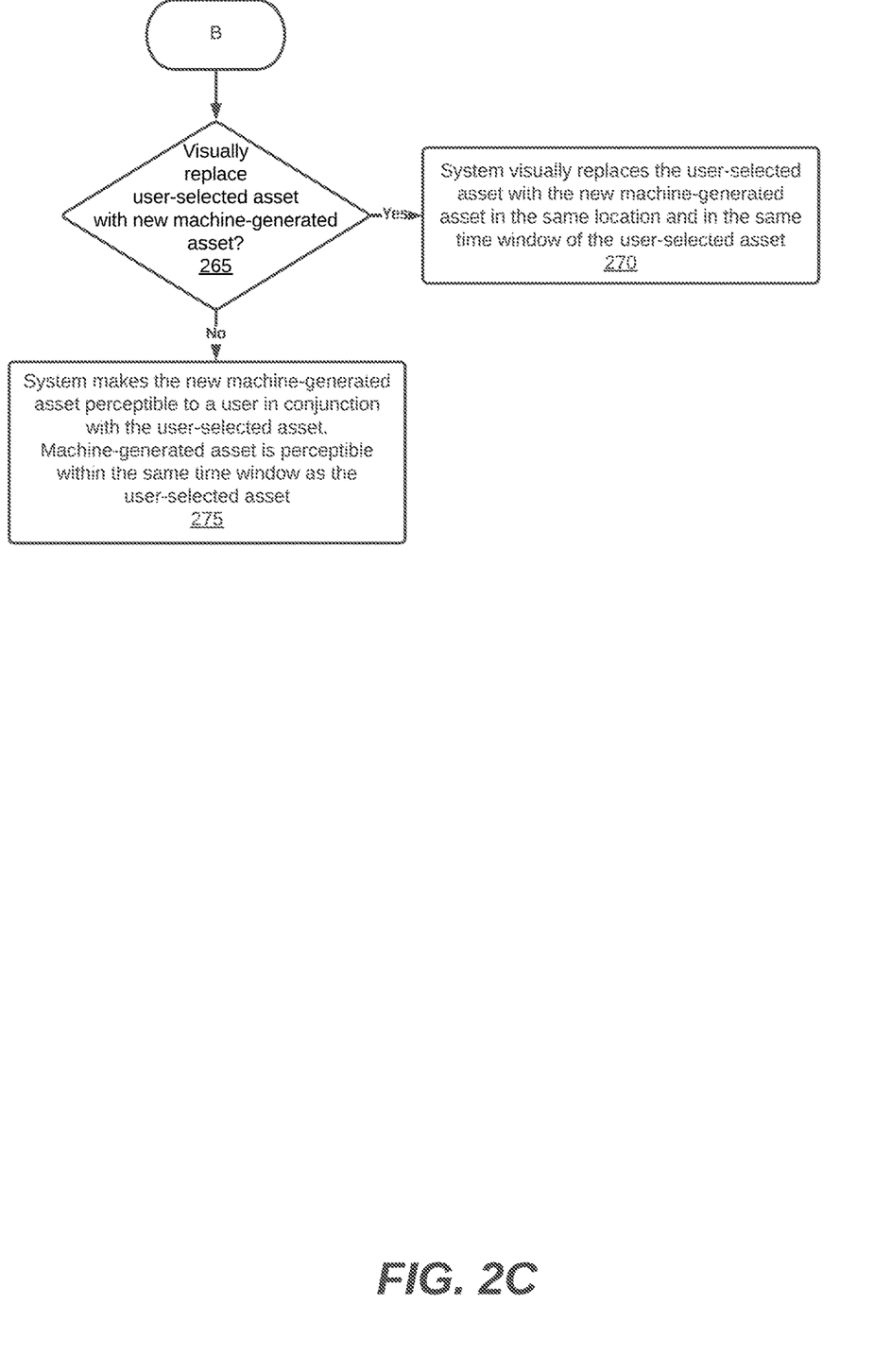

4. Method for Enabling a User to Guide Output of the Asset Enhancement Platform Via Proxy Elements in the Video Production Workspace FIGS. 2A-2C illustrate a method for enabling a user to guide the output of the Asset Enhancement Platform via proxy elements in the video production workspace. The proxy elements are assets that a user adds to the workspace and then transforms/replaces/enhances with the assistance of the ML enhancement modules in the Asset Enhancement Platform.

The system enables a user to add assets for a video to the video production workspace (step 210). The user is able to add a number of different multimedia types to the video productions workspace, including audio (voice and non-voice), text, images, video clips, and animations. These may come in form of characters, props, backgrounds, etc.

The system enables a user to enter an asset enhancement request for any of the assets in the workspace (step 215). Any asset may serve as a proxy for a machine-generated asset. Each asset in the workspace is a distinct entity which may be transformed independently of other assets in the workspace.

FIG. 3A illustrates an example of a scene 310 in a video production workspace. This scene includes a 2D image of a woman 320 sitting at a desk. FIG. 3B illustrates an example of user entering an asset-enhancement request. As shown in the figure, the user has selected character 320, and, in response, the system displayed a window 330 in which a user can enter an asset-enhancement request. In this case, the user has specified that they would like the selected character to be made 3D and have glasses.

In this example, the user typed a natural language request into a window to enter an asset enhancement request. However, there are many other ways to enable a user to enter an asset enhancement request. For example, a user may be able to both select and specify the asset enhancement request via natural language voice input. Alternatively, the system may present the user with a menu (e.g., a drop down menu) with various asset-enhancement and asset-creation options. For example, there could be a menu option for each type and style of asset that the ML enhancement modules can produce. As another example, the user could select an asset in the video production workspace and then upload an image and say, "copy this visual style." An ML enhancement module trained in neural transfer could transform the asset to the same style as the uploaded image.

When the system receives an asset enhancement request for a selected asset (step 220), this triggers the creation of a machine-generated asset by the Asset Enhancement Platform. In response to receiving the request, the system identifies a location and a time window associated with the user-selected asset in the workspace (step 225). As is described later, the asset generated in response to the asset enhancement request will appear at the same time as the user-selected asset, and, if the request is to transform the selected asset, in the same location as the user-selected asset.

The system also identifies one or more user-defined attributes for the asset enhancement request (step 230). In embodiments where a user is able to enter natural language requests, the system uses a natural language understanding (NLU) model to process the request and derive the attributes the user is requesting for the asset to be generated (i.e., it derives the user's intent). In the example in FIG. 3B, the user-defined attributes may be "3D" and "woman with glasses."

The system identifies one or more system-defined attributes of the user-selected asset, including a multimedia type (step 235). In one embodiment, the system-defined attributes are the metadata tags and an asset ID associated with the user-selected asset. An example of the system-defined attributes for the user-selected character 320 in FIG. 3B may be "2D," "character," "image," "woman," and "office." The system may also include metadata tags associated with other assets in the scene as part of the system-defined attributes that are inputted into the ML enhancement modules. In one embodiment, the system may determine the system-defined attributes and automatically send them to the applicable ML enhancement modules in step 245 (discussed below). In an alternate embodiment, the system may make a preliminary determination of the system-defined attributes, display them to the user, and enable the user to confirm (e.g., clicking "OK") or modify the system-defined attributes, before sending them to the applicable ML enhancement module(s).

The system identifies one or more ML enhancement modules to process the asset enhancement request (step 240). In one embodiment, a look-up table may specify the applicable module(s) based on the input asset type, the output asset type, and the style requested by the user. If no style is specified, the system may select several models, each of which will generate an asset, and then display the assets as options from which the user can select.

Figure 5:
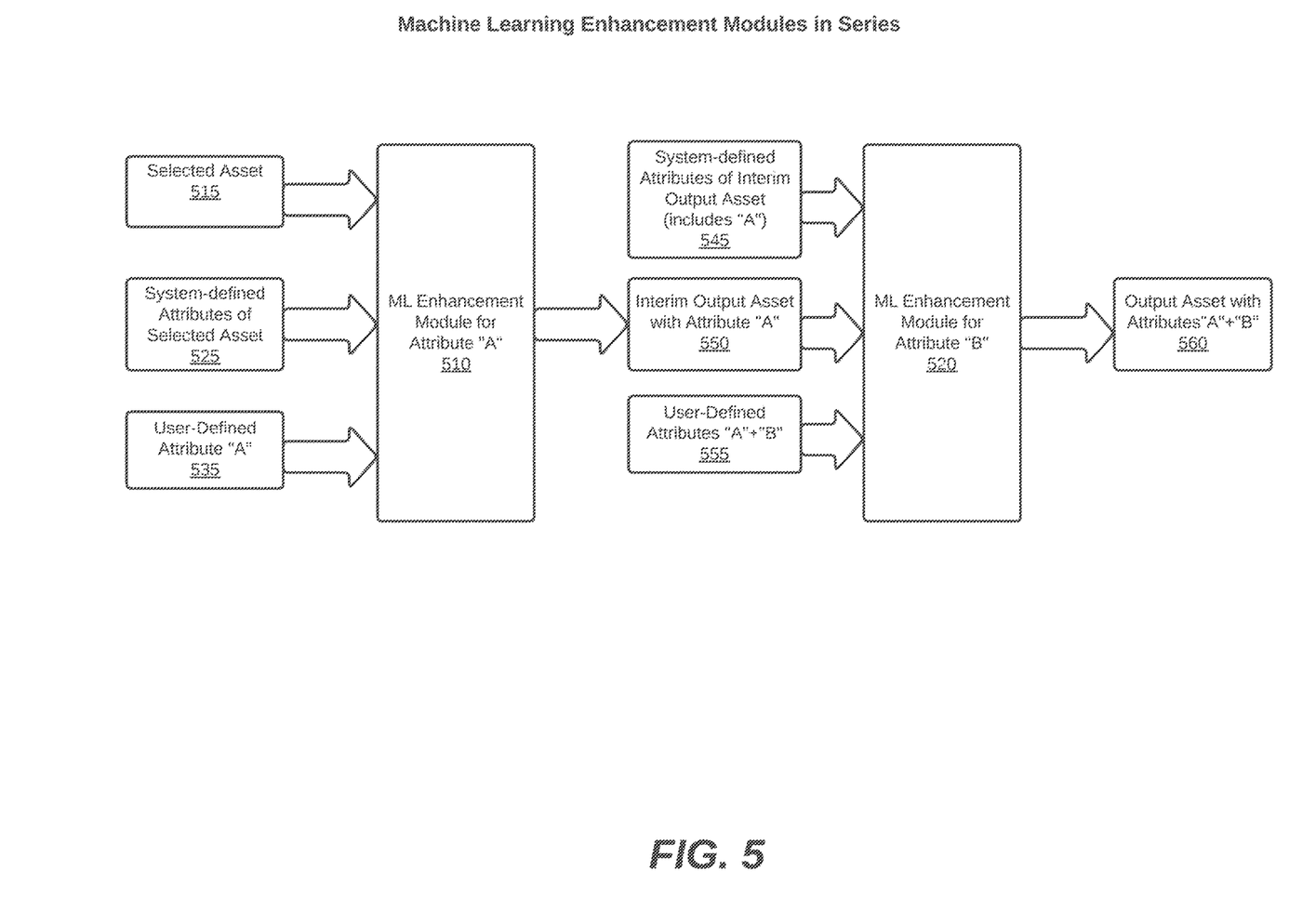
FIG. 5 is a block diagram that illustrates ML enhancement modules used in series.

Multiple ML enhancement modules may be required to fulfill the asset-enhancement request. In such case, the ML enhancement modules may be used in series or in parallel, depending on the nature of the request. For example, a user may select a 2D image and then request that the image be made 3D and in a certain style. A first ML enhancement module may convert the image to 3D and a second may convert the 3D image to the requested style. FIG. 5 illustrates ML enhancement modules being used in series. The user-defined attributes are "A" and "B". ML enhancement module 510 enhances the asset to have attribute "A" and ML enhancement module 520 enhances the asset to have attribute "B" to collectively produce an asset with attributes "A" and "B." More specifically, the input to ML enhancement module 510 is the user-selected asset 515 in the workspace, the system-defined attributes of the user-selected asset 525, and the user-defined attribute "A" 535. The output of the ML enhancement module 510 is interim output asset 550 with attribute "A". Output asset of enhancement module 510 becomes the input asset to ML enhancement module 520. The system-defined attributes 545 of the interim output asset (e.g., the metadata tags which include "A") and the user-defined attributes "A"+"B" 555 are also inputted into ML enhancement module 520, which produces output asset 560 with attributes "A"+"B".

Referring again to FIG. 2, the system inputs the user-selected asset, the system-defined attributes of the user-selected asset, and the user-defined attributes for the asset enhancement into the identified ML enhancement module(s) (step 245). The identified ML enhancement module(s) produce(s) and output(s) a machine-generated asset based on the input (steps 250, 255).

The system links the new machine-generated asset to the user-selected asset in the video productions workspace (step 260). In other words, the new machine-generated asset is added as a layer to the user-selected asset.

The system determines whether or not to visually replace the user-selected asset with the new machine-generated asset (step 265). This determination may be based the media type of the user-selected asset, the media type of the machine-generated asset, and on the nature of the request (i.e., is the user intent to transform the asset or create an asset to be played in conjunction with the user-selected asset in the video?). The assets have one or more metadata tags, including a tag that specify what media type the asset is (e.g., "image," "audio," "animation," etc.). For natural language asset-enhancement requests, the natural language model may classify the request with an intent when it processes the request, and this intent may be used to determine whether or not to visually replace the user-selected asset.

The system may use a lookup table to determine whether or not to visually replace the user-selected asset with the machine-generated asset. The lookup table may correlate certain media types and intents with certain actions. For example, if the user-selected asset and the machine generated asset are both "images" and the user intent is categorized as "transform," then the look up table may indicate that the machine-generated asset should visually replace the user-selected asset. Conversely, if the user-selected asset is an "image" and the machine-generated asset is "audio" and the user intent is "add," then the look up table may indicate that the machine-generated asset should be added to the video production workspace in conjunction with the user-selected asset and not as a visual replacement. Alternatively, the system may prompt the user to decide whether or not to visually replace the selected asset with the machine-generated asset and proceed based on the user's input.

In response to the system determining to visually replace the user-selected asset with the machine-generated asset, the system visually replaces the selected asset with the machine-generated asset in the same location and the same time window in the video being produced as the user-selected asset (step 270). The user-selected asset is still part of the workspace, it is just not visible. In the example of FIGS. 3A-3C, the original 2D graphic of the woman 320 at the desk from FIGS. 3A and 3B is visually replaced in FIG. 3C by the machine-generated 3D version of the woman 340 in the same location. The user-selected asset is visually replaced without affecting the other assets in the scene. This is because the system treats each asset in the workspace as an entity which can be transformed independent of the other assets in the workspace (although metadata from the other assets in the workspace may provide context for the transformation).

Otherwise, the system makes the machine-generated asset perceptible to the user in conjunction with the user-selected asset (step 275). In the video being generated in the workspace, the machine-generated asset is perceptible within the same time window as the user-selected asset. For example, if the user-selected asset is an animation, and the machine-generated asset is an audio track, the audio track is played in conjunction with the animation in the workspace.

The method described above enables a user to select any asset, at any position on screen and at any frame in the timeline, and request that the asset be transformed by machine learning models into another asset.

The user can iteratively transform an asset. A user can select a machine-generated asset and then enter another asset enhancement request. This process can be repeated until the user obtains the desired asset.

In step 220, a user can select multiple assets and enter an asset enhancement request for all the selected elements. If a user selects and enters an asset enhancement request for multiple assets in a scene, steps 230-275 would be performed for all the selected assets. For example, the user may want to change the image style of a plurality of assets in a scene. The system would then apply the applicable ML enhancement module to each of the selected assets. A machine-generated asset would be generated for each of the selected assets. The system assigns a unique ID to each asset in the workspace to distinguish one asset from another. A user may transform assets independently of each other and the video as a whole, or in conjunction with each other and the video as a whole, depending on which asset(s) a user selects in the video production workspace.

In certain embodiments and, for certain asset-enhancement requests, the ML enhancement modules may produce multiple machine-generated assets and allow the user to select one of them. For example, if a user requests that a 2D image be transformed to 3D, the system may produce images with 25%, 50%, 75%, and 100% 3D transformations applied and prompt the user to select one of the images.

In certain embodiments, a user is able to see the system-defined attributes (i.e., metadata) associated with an asset in the workspace. This includes system-defined attributes associated with machine-generated assets. For example, in FIG. 3C, a user could select the 3D machine-generated woman 340 and see the system-defined attributes associated with the graphic (e.g., "3D" "image," "graphic," "woman," "office") in a pop-up window.

5. Examples of Asset Enhancements

Below are few examples of how the system described herein can be used to generate assets for a video:

User imports a video clip of a man talking into the video production workspace. The user inputs an asset enhancement request indicating that the man should be singing, not speaking. A video-to-video ML enhancement module modifies the clip so that the man is singing, and the original clip is visually replaced with the modified clip.

User adds text to the workspace. The text reads "a cat is sitting next to a mouse." The user inputs an asset enhancement request indication that the text should be transformed into an animated cartoon clip of a cat sitting next to a mouse. A text-to-video ML enhancement module generates an animated cartoon clip of a cat sitting next to a mouse. The clip visually replaces the text in the workspace.

User adds a video clip of a cat by a fire to the workspace. User enters an asset enhancement request asking the system to produce relevant audio for the video clip. A video-to-audio ML enhancement module produces audio for the video. The audio is played in conjunction with the video clip (in the same time window) in the video produced in the workspace.

Use adds a simple triangle shape to the workspace. User enters an asset enhancement request asking the system to animate the triangle shape by having it move across the screen. An image-to-animation ML enhancement module produces an animation of the triangle moving across the screen and the animation visually replaces the static image of the triangle in the workspace. The user then enters a second asset enhancement request, asking that the triangle be changed to a photorealistic image of a 30-year old woman in a blue-and-gold dress walking. An animation-to-animation ML enhancement module produces an animation of a photorealistic 30-year old woman in a blue-and-gold dress walking. The system replaces the animated triangle with the animation of the woman walking.

These examples illustrate that a user does not need final assets to produce a final video. Users can instead work with proxy elements, such as simple shapes, and still produce a final quality video.

6. Training the Machine Learning Asset Enhancement Modules

The ML enhancement modules may be trained using deep learning, auto encoders, transformers and other machine learning techniques. In one embodiment, the modules use transformer architectures trained on phrase-image pairs and hence both an image and text can be passed into the models as parameters.

6.1 Neural Transfer

A neural style transfer technique may be used to transform the visual style of an asset or video from one style to another. This is a type of deep learning method that uses a convolutional neural network (CNN) to transfer the visual style of one image or video to another.

The neural style transfer technique works by training a CNN on a large dataset of images or videos in the source style, and then using the trained CNN to transform a target image or video into the same style. This is done by optimizing the CNN's parameters to minimize the difference between the source style and the generated style, while also preserving the content of the target image or video.

To perform neural style transfer on a video, a CNN is trained on a dataset of videos in the source style. This can be done using a variety of techniques, such as supervised learning, unsupervised learning, or reinforcement learning. Once the CNN is trained, it is then used to transform a target video into the same style by feeding the video frames into the CNN and applying the generated style to each frame.

Overall, neural style transfer is a specific machine learning technique that can be used to transform the visual style of a video from one style to another. This is done by training a convolutional neural network on a dataset of videos in the source style, and then using the trained CNN to transform a target video into the same style.

7.0 General

The methods described with respect to FIGS. 1-5 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for providing an interactive video-generation platform through which a user is able to guide the output of machine-learning modules to produce assets for a video, the method comprising:
    providing a multimedia video production workspace for creating videos;
    enabling a user to add a plurality of multimedia assets for a video to the multimedia workspace;
    providing an asset enhancement platform comprising a plurality of machine-learning modules trained to generate assets for a video in response to receiving an input asset, system-defined attributes of the input asset, and user-defined attributes for an output asset; and
    enabling a user to trigger and guide the output of the asset enhancement platform by performing the following:
        enabling a user to select an asset in the video production workspace and to enter an asset enhancement request for the selected asset, wherein the selected asset can be enhanced independent of other assets in the video and wherein any asset in the multimedia workspace may serve as a proxy for a machine-generated asset;
        receiving an asset enhancement request for a selected asset;
        identifying a location and a time window in the video associated with the selected asset;
        identifying one or more user-defined attributes for the asset enhancement request;
        identifying one or more system-defined attributes of the selected asset;
        identifying one or more machine learning modules in the asset enhancement platform to use to process the asset enhancement request;
        using the identified machine-learning module(s) to obtain a machine-generated asset having the user-defined attributes, wherein the selected asset, the user-defined attributes, and the system-defined attributes are inputted into the identified asset enhancement module(s);
        linking the machine-generated asset to the selected asset in the visual production workspace;
        determining whether to visually replace the selected asset with the machine-generated asset in the workspace;
        in response to determining to visually replace the proxy asset with machine-generated asset, visually replacing the selected asset with the machine-generated asset, wherein the machine-generated asset is displayed in the same location as the selected asset within the video production workspace and during the same time window as the selected asset; and
        in response to determining to add the machine-generated asset to the video production workspace without visually replacing the selected asset, making the machine-generated asset perceptible to a user in the video production workspace in conjunction with the selected asset and during the same time window as the selected asset.

2. The method of claim 1, wherein the types of assets a user is able to add to the video production workspace include both generic media forms and proprietary video asset types, wherein generic media forms include one or more of text, audio, images, animation, and video, and wherein proprietary video asset types include one or more of characters, character actions, backgrounds, and props.

3. The method of claim 1, wherein a plurality of machine learning modules are used serially or in parallel on the selected asset to produce the machine-generated asset.

4. The method of claim 1, wherein metadata is associated with the machine-generated asset, and the system determines whether or not to visually replace the selected asset with the machine-generated asset based on the metadata associated with the machine-generated asset and the system-defined attributes of the selected asset.

5. The method of claim 4, further comprising:
    displaying the metadata related to the machine-generated asset in the video production workspace.

6. The method of claim 1, wherein the asset enhancement platform also includes an algorithmic asset enhancement module configured to generate assets for a video in response to receiving an input asset, system-defined attributes of the input asset, and user-defined attributes for an output asset.

7. A system for providing an interactive video-generation platform through which a user is able to guide the output of machine-learning modules to produce assets for a video, the system comprising:
    one or more processors;
    one or more memory units coupled to the one or more processors, wherein the one or more memory units store instructions that, when executed by the one or more processors, cause the system to perform the operations of:
        providing a multimedia video production workspace for creating videos;
        enabling a user to add a plurality of multimedia assets for a video to the multimedia workspace,
        providing an asset enhancement platform comprising a plurality of machine-learning modules trained to generate assets for a video in response to receiving an input asset, system-defined attributes of the input asset, and user-defined attributes for an output asset, and;

enabling a user to trigger and guide the output of the asset enhancement platform by performing the following:
enabling a user to select an asset in the video production workspace and to enter an asset enhancement request for the selected asset, wherein the selected asset can be enhanced independent of other assets in the video and wherein any asset in the multimedia workspace may serve as a proxy for a machine-generated asset;
receiving an asset enhancement request for a selected asset;
identifying a location and a time window in the video associated with the selected asset;
identifying one or more user-defined attributes for the asset enhancement request;
identifying one or more system-defined attributes of the selected asset;
identifying one or more machine learning modules in the asset enhancement platform to use to process the asset enhancement request;
using the identified machine-learning module(s) to obtain a machine-generated asset having the user-defined attributes, wherein the selected asset, the user-defined attributes, and the system-defined attributes are inputted into the identified asset enhancement module(s);
linking the machine-generated asset to the selected asset in the visual production workspace;
determining whether to visually replace the selected asset with the machine-generated asset in the workspace;
in response to determining to visually replace the proxy asset with machine-generated asset, visually replacing the selected asset with the machine-generated asset, wherein the machine-generated asset is displayed in the same location as the selected asset within the video production workspace and during the same time window as the selected asset; and
in response to determining to add the machine-generated asset to the video production workspace without visually replacing the selected asset, making the machine-generated asset perceptible to a user in the video production workspace in conjunction with the selected asset and during the same time window as the selected asset.

8. The system of claim 7, wherein the types of assets a user is able to add to the video production workspace include both generic media forms and proprietary video asset types, wherein generic media forms include one or more of text, audio, images, animation, and video, and wherein proprietary video asset types include one or more of characters, character actions, backgrounds, and props.

9. The system of claim 7, wherein a plurality of machine learning modules are used serially or in parallel on the selected asset to produce the machine-generated asset.

10. The system of claim 7, wherein metadata is associated with the machine-generated asset, and the system determines whether or not to visually replace the selected asset with the machine-generated asset based on the metadata associated with the machine-generated asset and the system-defined attributes of the selected asset.

11. The system of claim 10, further comprising:
displaying the metadata related to the machine-generated asset in the video production workspace.

12. The system of claim 7, wherein the asset enhancement platform also includes an algorithmic asset enhancement module configured to generate assets for a video in response to receiving an input asset, system-defined attributes of the input asset, and user-defined attributes for an output asset.

13. A non-transitory computer-readable medium comprising a computer program, that, when executed by a computer system, enables the computer system to perform the following method for providing an interactive video-generation platform through which a user is able to guide the output of machine-learning modules to produce assets for a video, the method comprising:
providing a multimedia video production workspace for creating videos;
enabling a user to add a plurality of multimedia assets for a video to the multimedia workspace,
providing an asset enhancement platform comprising a plurality of machine-learning modules trained to generate assets for a video in response to receiving an input asset, system-defined attributes of the input asset, and user-defined attributes for an output asset, and;
enabling a user to trigger and guide the output of the asset enhancement platform by performing the following:
enabling a user to select an asset in the video production workspace and to enter an asset enhancement request for the selected asset, wherein the selected asset can be enhanced independent of other assets in the video and wherein any asset in the multimedia workspace may serve as a proxy for a machine-generated asset;
receiving an asset enhancement request for a selected asset;
identifying a location and a time window in the video associated with the selected asset;
identifying one or more user-defined attributes for the asset enhancement request;
identifying one or more system-defined attributes of the selected asset;
identifying one or more machine learning modules in the asset enhancement platform to use to process the asset enhancement request;
using the identified machine-learning module(s) to obtain a machine-generated asset having the user-defined attributes, wherein the selected asset, the user-defined attributes, and the system-defined attributes are inputted into the identified asset enhancement module(s);
linking the machine-generated asset to the selected asset in the visual production workspace;
determining whether to visually replace the selected asset with the machine-generated asset in the workspace;
in response to determining to visually replace the proxy asset with machine-generated asset, visually replacing the selected asset with the machine-generated asset, wherein the machine-generated asset is displayed in the same location as the selected asset within the video production workspace and during the same time window as the selected asset; and
in response to determining to add the machine-generated asset to the video production workspace without visually replacing the selected asset, making the machine-generated asset perceptible to a user in the video production workspace in conjunction with the selected asset and during the same time window as the selected asset.

14. The non-transitory computer-readable medium of claim 13, wherein the types of assets a user is able to add to the video production workspace include both generic media forms and proprietary video asset types, wherein generic media forms include one or more of text, audio, images, animation, and video, and wherein proprietary video asset types include one or more of characters, character actions, backgrounds, and props.

15. The non-transitory computer-readable medium of claim 13, wherein a plurality of machine learning modules are used serially or in parallel on the selected asset to produce the machine-generated asset.

16. The non-transitory computer-readable medium of claim 13, wherein metadata is associated with the machine-generated asset, and the system determines whether or not to visually replace the selected asset with the machine-generated asset based on the metadata associated with the machine-generated asset and the system-defined attributes of the selected asset.

17. The non-transitory computer-readable medium of claim 16, further comprising:
   displaying the metadata related to the machine-generated asset in the video production workspace.

18. The non-transitory computer-readable medium of claim 13, wherein the asset enhancement platform also includes an algorithmic asset enhancement module configured to generate assets for a video in response to receiving an input asset, system-defined attributes of the input asset, and user-defined attributes for an output asset.

* * * * *